United States Patent [19]

Mertzel et al.

[11] Patent Number: 6,015,861
[45] Date of Patent: Jan. 18, 2000

[54] METHOD FOR MANUFACTURE OF ELASTOMERIC ALLOYS USING RECYCLED RUBBERS

[75] Inventors: Elaine A. Mertzel, Northville, Mich.; Ronald G. Weber, Toledo, Ohio; Louis Citarel, Southfield, Mich.

[73] Assignee: The Standard Products Company, Cleveland, Ohio

[21] Appl. No.: 08/992,547

[22] Filed: Dec. 17, 1997

[51] Int. Cl.$^7$ .............................. C08L 9/00; C08L 23/00; C08F 8/00; C08C 8/00
[52] U.S. Cl. ............................ 525/232; 525/98; 525/193; 525/197; 525/240; 524/496; 524/80; 241/21; 428/35
[58] Field of Search .............................. 525/232, 98, 193, 525/240; 241/21; 428/35.2; 524/80, 496

[56] References Cited

U.S. PATENT DOCUMENTS

| | | | |
|---|---|---|---|
| 3,835,201 | 9/1974 | Fischer | 260/897 A |
| 3,862,106 | 1/1975 | Fischer | 260/80.78 |
| 4,049,588 | 9/1977 | Lee et al. | 260/2.3 |
| 5,010,122 | 4/1991 | Koski | 524/80 |
| 5,411,215 | 5/1995 | Rouse | 241/21 |
| 5,510,419 | 4/1996 | Burgoyne et al. | 525/98 |

OTHER PUBLICATIONS

A. Y. Coran & R. Patel, "Rubber–Thermoplastic Composition. Part I. EPDM–Polypropylene Thermoplastic Vulcanizates," 53 *Rubber Chemistry and Technology* 141 (A.C.S. 1980).

S. Danesi & E. Garagnani, "Olefinic Thermoplastic Elastomers," 37 *Kautschuk+Gummi Kunststoffe* 195 ( Mar. 1984).

R. Ranalli, "Ethylene—Propylene Rubber—Polypropylene Blends," 3 *Developments in Rubber Technology* 21 (A. Whelan & K. S. Lee eds., 1982).

S. Al–Malaika & E. J. Amir, "Thermoplastic Elastomers: Part 2–Effect of Natural Rubber\Polypropylene as Solid Phase Dispersant in Polypropylene\Polypropylene as Solid Phase Dispersant in Polypropylene\Polyethylene Blends," 16 *Polymer Degradation and Stability* 347 (1986).

Baby Kuriakose & S. K. De, "Studies on the Melt Flow Behavior of Thermoplastic Elastomers from Polypropylene—Natural Rubber Blends," 25 *Polymer Engineering and Science* 630 (1985).

*Primary Examiner*—Bernard Lipman
*Assistant Examiner*—Tanya Zalukaeva
*Attorney, Agent, or Firm*—Harness, Dickey & Pierce, P.L.C.

[57] ABSTRACT

Disclosed is a method of preparing a thermoplastic resin composition that includes combining a ground crosslinked rubber with a thermoplastic resin and a compatibilizer based on a paraffinic oil to form a blend thermoplastic composition. The ground crosslinked rubber has an average particle size of about 80 mesh or smaller. The thermoplastic resin includes at least one polyolefinic resin. The ground crosslinked rubber is included in amounts of up to about 70% by weight, based on the weight of the blend thermoplastic composition.

14 Claims, No Drawings

METHOD FOR MANUFACTURE OF ELASTOMERIC ALLOYS USING RECYCLED RUBBERS

FIELD OF THE INVENTION

The present invention is directed to a method of preparing blend thermoplastic compositions using particles of recycled vulcanized, or crosslinked, rubber and to the compositions made by the method and articles formed from these compositions. The thermoplastic compositions produced by the method may be formed into many products, including automotive and industrial components.

BACKGROUND AND SUMMARY OF THE INVENTION

Both manufacturers and the general public have placed an emphasis in recent years on recycling materials. Recycling materials is desirable from the standpoint of reducing waste that must be landfilled, burned, or otherwise discarded. It has become desirable for manufacturers to include recycled plastic or recycled rubber content in the manufacture of articles. In some instances, recycled materials may also offer a cost advantage over virgin materials.

Recycling of thermoset polymeric materials, however, has faced serious difficulties in the preparation of materials for recycling and in maintaining desired properties for the articles that incorporate recycled material. One avenue for recycling crosslinked rubbers has been the use of ground crosslinked rubber as a filler in new thermoset polymeric materials. Ground crosslinked rubber may be produced in mesh sizes of from 10 to over 300, with a typical range being about 40–80 mesh. The ground crosslinked rubber has commonly been recycled by adding it to uncrosslinked rubber and then vulcanizing the blend rubber. In general, it has been reported in literature that blends cannot include more than about 10% recycled rubber without suffering a significant decrease in properties, including surface roughness. Mixtures including up to 30% ground crosslinked rubber in new rubber have been reported to have somewhat lower tensile strength as compared to virgin rubber.

One solution to the problem of how to incorporate larger amounts of recycled rubber without a decrease in properties is to chemically treat the recycled rubber. Stosky reported in "Innovation in the Development and Use of Recycled Rubber," Paper No. 42, Rubber Division, American Chemical Society (May 6–9, 1997) that chemically treated recycled rubber could be incorporated in amounts of up to 75% in a blend with virgin rubber, resulting in a material having equivalent or even superior performance as compared to virgin rubber. The chemical treatment appears to involve a surface treatment that allows for crosslinks between the ground crosslinked rubber and the virgin thermosetting material. Another method of recycling rubber involves de-vulcanizing the rubber by physical or chemical means. De-vulcanized rubber may be mixed with virgin material, re-molded, and then re-vulcanized along with the new material to produced a crosslinked blend. A process of treating ground crosslinked rubber with a caustic gas to allow bonding with other polymers has also been reported.

These methods, however, involve added reactions and manufacturing steps that make recycling of materials more expensive. Moreover, these methods are directed to thermoset materials only. Thus, the need remains for a relatively simple and effective means of recycling cured rubber scrap into new articles, particularly articles formed from thermoplastic compositions.

The present invention provides a method of recycling a cured EPDM terpolymer or EPR copolymer rubber, or mixtures including these rubbers, by blending the recycle rubber into a thermoplastic polyolefin resin to form a blend composition. The blend compositions comprise ground crosslinked rubber having a particle size of about 80 mesh or smaller, preferably of about 120 mesh or smaller. (The mesh size is inversely proportional to the particle size.) The compositions prepared according to the methods of the invention may include a surprisingly high level of recycle rubber without adverse effect on physical or aesthetic properties. Thus, the blend thermoplastic materials produced may comprise up to about 70% by weight of the ground crosslinked rubber, based upon the total weight of the blend material. The thermoplastic blend materials of the invention also comprise at least one thermoplastic polyolefin resin and a compatibilizer.

DETAILED DESCRIPTION

The term "ground crosslinked rubber" as used in relation to the methods and compositions of the invention refers to at least partially crosslinked or vulcanized rubber that has been reduced to particles. Preferably, the rubber is fully crosslinked; i.e., the crosslinking has been carried to an extent that formation of further crosslinks, if possible, would not substantially improve the physical properties of the rubber. The particle size of the recycle ground crosslinked rubber of the invention is about 80 mesh or smaller, preferably about 120 mesh or smaller, and it is especially preferred that the particle size be about 200 mesh or smaller.

The ground crosslinked rubber particles may be prepared by a number of methods. In one method, the rubber is swelled with solvent and then ground to a fine particle size. The rubber may be ground cryogenically. In a preferred procedure, the recycled rubber particles are prepared according to the procedure in Rouse, U.S. Pat. No. 5,411,215, incorporated herein by reference. In this procedure, the rubber is ground as a 10% by weight slurry in water of 10 mesh particles in a series of grinding mills having progressively finer grinding stone.

The rubbers that may be recycled in the methods and compositions of the invention are ethylene propylene rubber (also known as EPM or EPR), ethylene propylene diene monomer rubber (EPDM), and mixtures and blends of these. The rubbers will be collectively referred to herein as EPDM. Mixtures and blends of EPDM with other rubbers may also be used, as well as elastomeric alloys that include these rubbers. The rubber compound, which includes the rubber and any additives, may also typically include up to about 50% additives, preferably up to about 15% additives, based upon the weight of the rubber compound. Example of useful additives include, without limitation, accelerators, oils, colorants and fillers, especially carbon black.

The ground crosslinked rubber is mixed with a thermoplastic component. The thermoplastic component is preferably a polyolefinic material. Among preferred materials are homopolymers of ethylene, propylene, and butylene, and copolymers that include one or more of these monomers. In a particularly preferred embodiment, the recycled ground crosslinked rubber is ethylene propylene diene monomer rubber and the thermoplastic component is selected from polyethylene, polypropylene, ethylene copolymers, propylene copolymers, poly(ethylene propylene) copolymers, and combinations of these. In a particularly preferred embodiment, the rubber particles comprise EPDM rubber that is at least partially cured, preferably fully cured, and the thermoplastic composition comprises polypropylene.

The ground crosslinked rubber particles can be included in the thermoplastic composition in amounts of up to about 70% by weight, and preferably up to about 60% by weight, based upon the total weight of the blend thermoplastic composition. Preferably, at least about 5% by weight of the recycle ground crosslinked rubber is included. The amount of ground rubber that is included is determined based upon the particular application and can readily be determined by straightforward testing.

The compositions of the invention also include a compatibilizer. In general, useful compatibilizers are plasticizers and oils that are used to improve physical properties of the blend. It is particularly preferred to include as a compatibilizer a paraffinic oil or derivative of a paraffinic oil. A compatibilizer is included in amounts of at least about 1% by weight of the blend. It is preferred to include at least about 10% by weight compatibilizer, based upon the total weight of the blend thermoplastic material. Preferably, no more than about 25% by weight of compatibilizer is included in the compositions of the invention.

Customary additives such as lubricants, fillers, pigments, plasticizers, surface-modifying additives, UV absorbers, antioxidants, hindered amine or amide light stabilizers, and so on may be added to the thermoplastic composition along with the ground crosslinked rubber and compatibilizer. Blends, particularly blends containing EPDM rubber that has not been pigmented, can be colored to a desired color. For instance, an automotive component formed from the blend may be colored to complement the color of a vehicle body to which it is to be attached.

In general, there must be enough of the thermoplastic material to hold the alloy together. There should also be adequate dispersion or distribution of the rubber particles in the thermoplastic resin medium. When the blend thermoplastic material is used in an injection molding operation, the blend thermoplastic material may include up to about 70% by weight, preferably up to about 60%, of the rubber particles. When lower compression set (as may be measured by ASTM 395) is needed, the amount of rubber is higher; however, lower levels of rubber are included when surface properties, such as surface smoothness, are important. When the blend thermoplastic material is to be extruded, a lower weight percentage of rubber particles, such as less than about 40% by weight, may be used to obtain better surface smoothness.

The invention embraces a broad range with respect to levels of the rubber particles that may be included in the blend compositions, and the particular percentage by weight of rubber particles may be chosen to suit the article to be manufactured from the blend. In general, the compression set improves, or decreases, with higher levels of the rubber particles. Tensile properties, however, are generally better with lower levels of rubber particles in the blend thermoplastic material. Thus, it is necessary to balance the levels of the thermoplastic and the rubber particles in the thermoplastic material in view of the properties required for the ultimate article that is to be made from it. The blend thermoplastic materials of the invention typically have hardnesses of about 60 Shore A, and hardnesses of up to about 60 Shore D are possible. When the rubber particles are included in higher amounts, it is preferred that the molding or shaping conditions be controlled so that the surface of the part being formed is the thermoplastic component of the blend.

The blend thermoplastic material of the invention is particularly useful as a replacement for conventional rubber materials. The blend thermoplastic material offers several advantages over materials that are presently available. First, the materials are less expensive due to the utilization of recycled rubber. Secondly, the blend thermoplastic materials, like other thermoplastic compositions, may be remelted and reformed. In addition, the process by which the blend thermoplastic materials of the invention is manufactured is more straightforward and less sensitive to manufacturing conditions as compared to manufacture of rubbers containing recycled rubber. Moreover, the present blend thermoplastic material may be prepared using the equipment usually employed in preparing thermoplastic blends rather than the specialized equipment required for dynamic vulcanization.

The blend thermoplastic materials of the invention may be prepared by mixing the thermoplastic composition, additives, including compatibilizer, and the rubber particles in either a continuous or batch process. Such processes may be carried out using, for example and without limitation, twin screw extruders, Buss extruders, continuous milling lines, or with a high-shear or low-shear mixer. The mixture may then be extruded and pelletized according to usual methods. The pellets may be either packaged for future use or used immediately in a process of forming an article. The pellets or blends of the invention may be formed into articles according to any of the methods known in the art for thermal processing of thermoplastic resin compositions. For example, compression molding, vacuum molding, injection molding, thermoforming, blow molding, calendering, casting, extrusion, filament winding, laminating, rotational or slush molding, transfer molding, lay-up or contact molding, stamping, and combinations of these methods may be used with the blend thermoplastic materials.

The blend thermoplastic materials of the invention may be formed into many different kinds of articles. In particular, the blend thermoplastic materials of the invention may be formed into seals, seal extensions, and other automotive components. Articles that need low compression set are particularly suited for the blend materials of the invention.

The invention is further described and illustrated by the following examples. The examples are intended to be instructive and do not in any way limit the scope of the invention as described and claimed.

EXAMPLES

Example 1

|  | Parts by Weight |
|---|---|
| Recycle ground EPDM, 200 mesh | 100 |
| W110 polypropylene (available from Rexene Products Co., Dallas, TX) | 60 |
| Flexon 885 Paraffinic Oil (available from Exxon Chemical Co., Houston, TX) | 30 |
| Silica FK500LS (available from Degussa Corp., Ridgefield Park, NJ) | 3 |
| Antioxidant | 0.2 |
| Lubricant | 0.4 |

Example 2

| | Parts by Weight |
|---|---|
| Recycle ground EPDM, 120 mesh | 100 |
| 3T1A polypropylene (available from Rexene Products Co., Dallas, TX) | 234 |
| Flexon 885 Paraffinic Oil (available from Exxon Chemical Co., Houston, TX) | 50 |
| Silica FK500LS (available from Degussa Corp., Ridgefield Park, NJ) | 3 |
| Antioxidant | 0.2 |
| Lubricant | 0.4 |

Example 3

| | Parts by Weight |
|---|---|
| Recycle ground EPDM, 120 mesh | 100 |
| W110 polypropylene (available from Rexene Products Co., Dallas, TX) | 67 |
| Flexon 885 Paraffinic Oil (available from Exxon Chemical Co., Houston, TX) | 25 |
| Silica FK500LS (available from Degussa Corp., Ridgefield Park, NJ) | 3 |
| Antioxidant | 0.2 |
| Lubricant | 0.4 |

The ingredient of the examples were mixed in a low shear mixer, then extruded and pelletized. Plaques of 6'×6' were injection molded from the compositions of Examples 1–3 and from several commercially available materials. The plaques were tested to compare the properties of the compositions of the invention to the properties of the commercially available materials. (The SANTOPRENE materials are available from Advanced Elastomer Systems, Akron, Ohio; the MULTIBASE material is available from Multibase Co., Inc. Copley, Ohio.) The results of the testing are set out in Table 1.

TABLE 1

| Property | Example 1 | Example 2 | Example 3 | Santoprene 121-65W233 | Santoprene 79W233 | Multibase MFA 6406 | Rubber |
|---|---|---|---|---|---|---|---|
| Hardness (ASTM D2240) | 72 Shore A | 45 Shore D | 35 Shore D | 72 Shore A | 79 Shore A | 65 Shore A | 65 Shore A |
| Compression Set, 22 hr. @ 70 C (%) (ASTM D395) | 56 | 75 | 52 | 53 | 59 | 93 | 25 max. |
| Tensile at Break (psi) (ASTM D412) | 803 | 2400 | 1235 | 727 | 737 | 544 | 1160 |
| Elongation at Break (%) (ASTM D412) | 226 | 495 | 152 | 651 | 411 | 625 | 150 |
| *Fogging, 3 hr. @ 100 C (%) (Ford FLTM BO 116-03) | 98 (pass) | 95 (pass) | 95 (pass) | 54 (fail) | 66 (fail) | 55 (fail) | 70 min. |
| Tear Strength (kN/m) (ASTM D624) | 31 | | 32 | | | 21 | (1305 psi) |

*Fogging must be ≧ 70 to be automotive quality.

The invention has been described in detail with reference to preferred embodiments thereof. It should be understood, however, that variations and modifications can be made within the spirit and scope of the invention.

What is claimed is:

1. A method of preparing a rubber-blend thermoplastic composition, comprising the steps of:
   (a) providing a ground crosslinked rubber having an average particle size of about 80 mesh or smaller; and
   (b) combining the ground crosslinked rubber with a thermoplastic polyolefinic material and a compatibilizer based on a paraffinic oil to form a blend thermoplastic resin composition.

2. A method according to claim 1, wherein the blend thermoplastic composition comprises no more than about 70% by weight of the ground crosslinked rubber.

3. A method according to claim 1, wherein the rubber has an average particle size of about 120 mesh or smaller.

4. A method according to claim 1, wherein the rubber has an average particle size of about 200 mesh or smaller.

5. A method according to claim 1, wherein the thermoplastic polyolefinic material comprises a member selected from the group consisting of: homopolymers and copolymers of ethylene, propylene, and butylene, and combinations thereof.

6. A method according to claim 1, wherein the thermoplastic polyolefinic material comprises a member selected from the group consisting of polyethylene, polypropylene, ethylene copolymers, propylene copolymers, poly(ethylene propylene) copolymers, and combinations thereof.

7. A method according to claim 1, wherein the rubber comprises a member of the group consisting of ethylene propylene rubber, ethylene propylene diene rubber, and combinations thereof.

8. A method according to claim 1, wherein the rubber is ethylene propylene diene monomer rubber and the thermoplastic polyolefinic material is polypropylene.

9. A method according to claim 1, wherein the ground crosslinked rubber is provided by the steps of comprising:
   (a) providing an aqueous slurry of about 10% by weight of 10 mesh particles of crosslinked rubber;
   (b) grinding the slurry in a series of grinding mills having progressively finer grinding stones.

10. A method according to claim 1, wherein said step (b) is carried out using a member selected from the group consisting of twin screw extruders, Buss extruders, continuous mill lines, high-speed mixers, low-speed mixers, and combinations thereof.

11. A method according to claim 1, wherein said step (b) is carried out by substantially melting the thermoplastic polyolefinic material and blending in the rubber particles.

12. A method according to claim 1, further comprising a step of pelletizing the thermoplastic composition to form pellets of thermoplastic resin.

13. A method according to claim 12, further comprising a step of molding the pellets of thermoplastic resin into an article, wherein from about 5% to about 70% by weight of the ground crosslinked rubber is included in the rubber-blend thermoplastic composition.

14. A method according to claim 12, further comprising a step of extruding the pellets of thermoplastic resin into an article, wherein from about 5% to about 70% by weight of the ground crosslinked rubber is included in the rubber-blend thermoplastic composition.

* * * * *

UNITED STATES PATENT AND TRADEMARK OFFICE
CERTIFICATE OF CORRECTION

PATENT NO.   : 6,015,861
DATED        : January 18, 2000
INVENTOR(S)  : Elaine A. Mertzel et al.

It is certified that error appears in the above-identified patent and that said Letters Patent is hereby corrected as shown below:

Abstract, References Cited,
U.S. PATENT DOCUMENTS, the following references should be added:

| | | | |
|---|---|---|---|
| 5,073,597 | 12/1991 | Puydak et al. | 525/237 |
| 5,397,832 | 3/1995 | Elllul | 524/515 |
| 5,574,105 | 11/1996 | Venkataswamy | 525/179 |
| 5,589,544 | 12/1996 | Horrion | 525/176 |
| 5,714,545 | 2/1998 | Lee et al. | 525/193 |

Under OTHER PULICATIONS, in the publication beginning "S. Al-Malaika & E.J. Amir,..." the words "as Solid Phase Dispersant in Polypropylene/Polypropylene" should be deleted.

Signed and Sealed this

Thirtieth Day of October, 2001

Attest:

NICHOLAS P. GODICI
Attesting Officer    Acting Director of the United States Patent and Trademark Office